United States Patent [19]
Kress et al.

[11] Patent Number: 5,170,851
[45] Date of Patent: Dec. 15, 1992

[54] ELECTRIC TOOL

[75] Inventors: Willy Kress; Alfred Binder, both of Bisingen, Fed. Rep. of Germany

[73] Assignee: Kress-Elektrik GmbH & Co., Bisingen, Fed. Rep. of Germany

[21] Appl. No.: 551,482

[22] Filed: Jul. 11, 1990

[30] Foreign Application Priority Data

Jul. 15, 1989 [DE] Fed. Rep. of Germany ....... 3923421
Feb. 14, 1990 [DE] Fed. Rep. of Germany ....... 4004464

[51] Int. Cl.$^5$ .............................................. B25F 5/02
[52] U.S. Cl. ..................................... 173/29; 200/567; 310/47; 310/50
[58] Field of Search ............... 173/29, 170; 310/47, 310/50; 408/20; 200/566, 567; 81/57.11

[56] References Cited

U.S. PATENT DOCUMENTS

| 4,370,579 | 1/1983 | Kobayashi et al. | 310/50 |
| 4,505,170 | 3/1985 | Van Laere | 81/464 |
| 4,619,162 | 10/1986 | Van Laere | 173/104 X |
| 4,822,958 | 4/1989 | Van Laere | 200/1 V |
| 4,905,423 | 3/1990 | Van Laere | 310/47 X |

FOREIGN PATENT DOCUMENTS

| 677216 | 6/1939 | Fed. Rep. of Germany. |
| 940477 | 3/1956 | Fed. Rep. of Germany. |
| 3311422A1 | 10/1984 | Fed. Rep. of Germany. |
| 3311557A1 | 10/1984 | Fed. Rep. of Germany. |
| 3502442A1 | 7/1986 | Fed. Rep. of Germany. |
| 3413233C2 | 11/1989 | Fed. Rep. of Germany. |
| 8908646.5 | 11/1989 | Fed. Rep. of Germany. |
| 3923421A1 | 1/1991 | Fed. Rep. of Germany. |

Primary Examiner—Douglas D. Watts
Assistant Examiner—Raymond D. Woods
Attorney, Agent, or Firm—Darby & Darby

[57] ABSTRACT

For the purposes of assembling an electric tool, and especially an electric hand tool such as, for example, a hand drill, a grinder or a sabre saw, it is proposed to use modular components that are to be axially inserted into and connected with each other. The components comprise a self-contained electric driving motor that supports the rotor shaft in a centered position by means of end shields on both sides that are rigidly fixed to the stator, a self-contained gearing head that is fixed to the motor, and at least a partially tubular, single piece main housing that accommodates the driving motor and the gearing head, an electric circuitry module inserted into the main housing, and a rear cover for the housing.

15 Claims, 5 Drawing Sheets

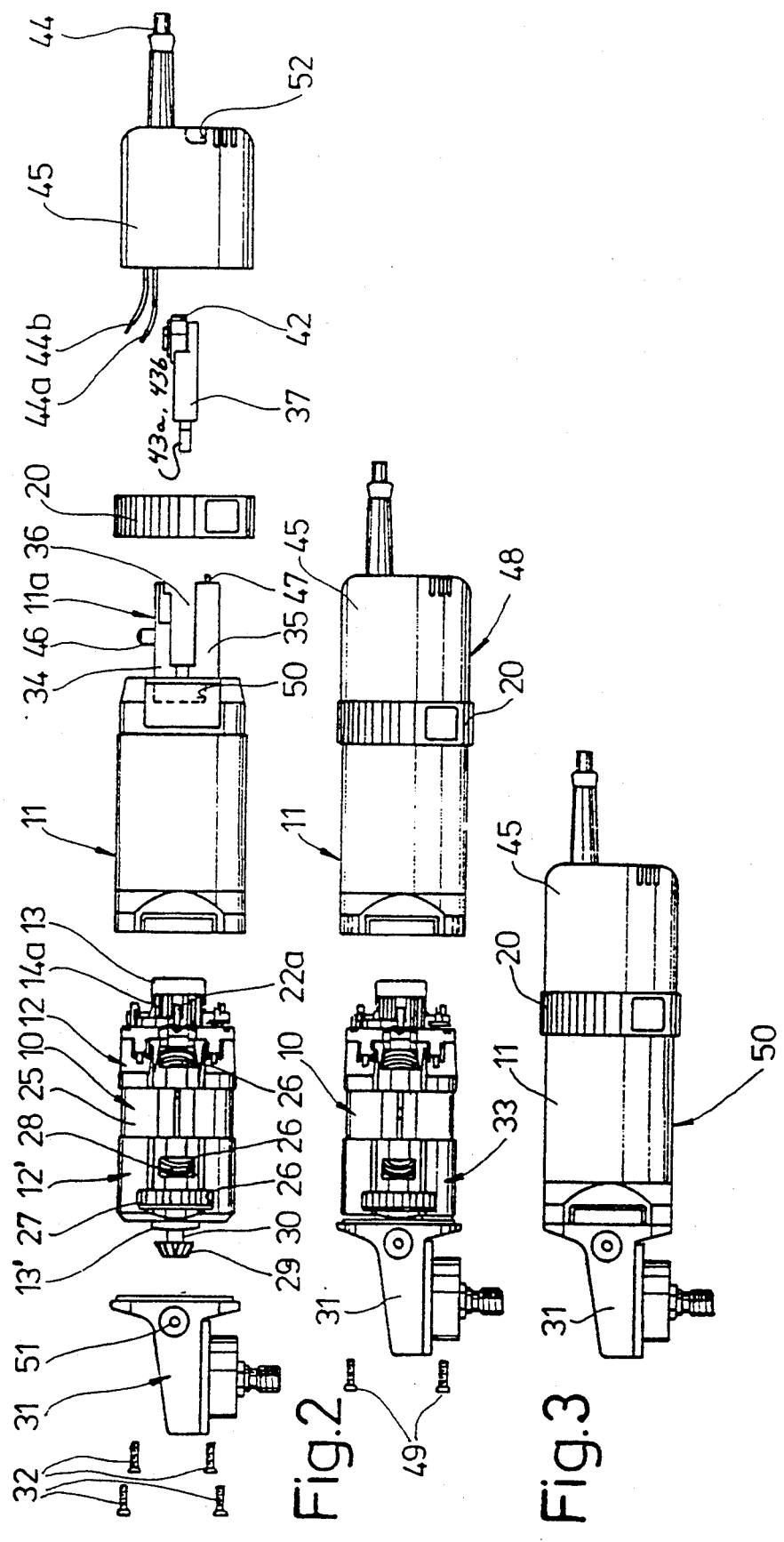

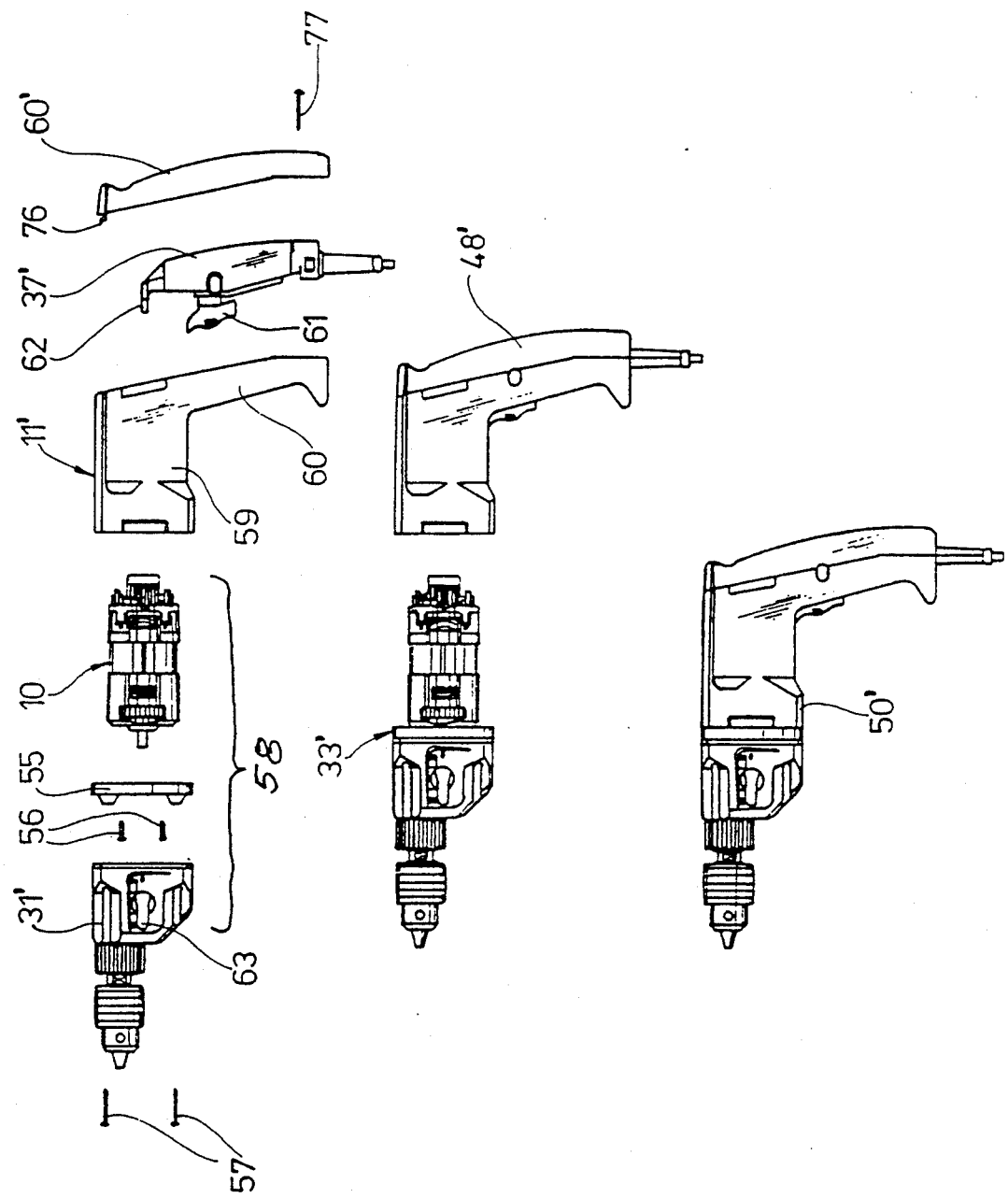

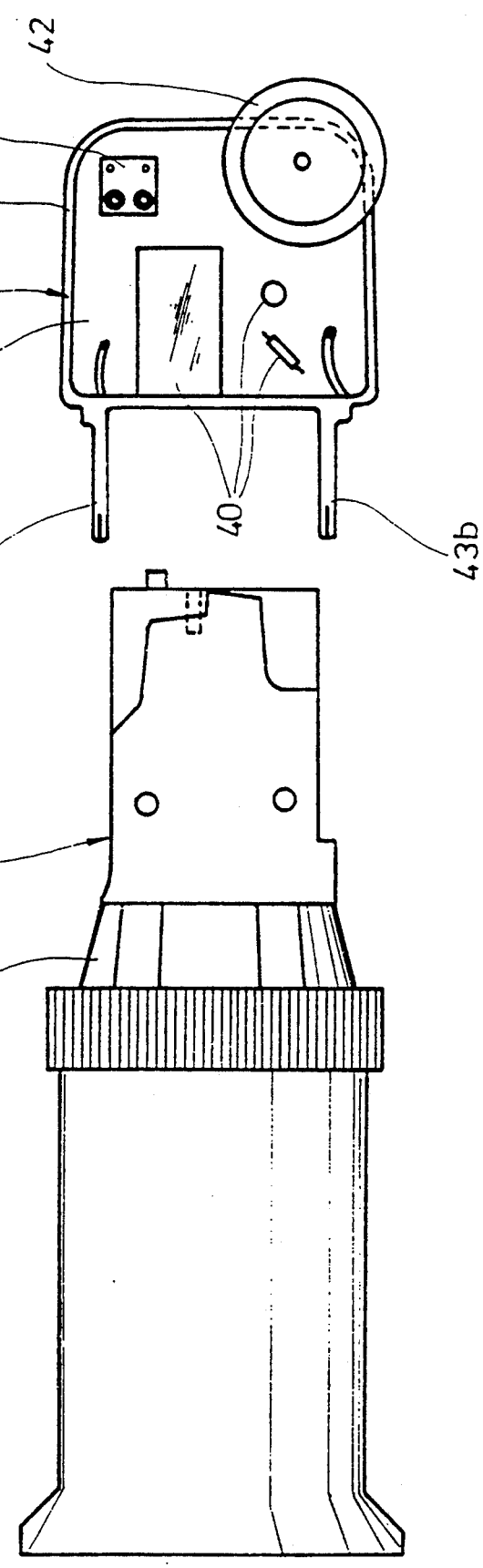

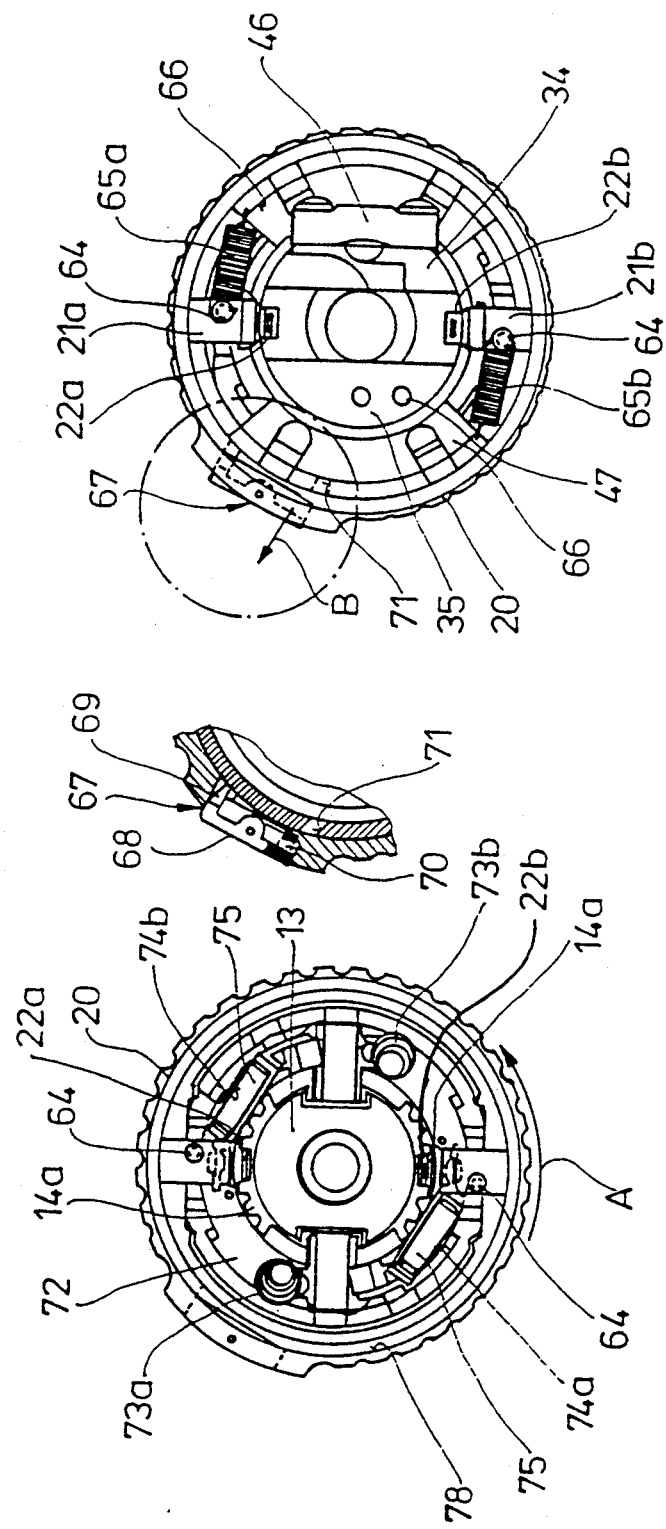

ELECTRIC TOOL

BACKGROUND OF THE INVENTION

The starting point of the present invention is an electric tool, especially an electric hand tool, according to the preamble of claim 1.

Electric hand tools always consist of a multitude of parts and components that have to be so arranged with respect to each other that—taken all together—they will constitute an operating assembly and have also to be so adjusted to each other as to ultimately yield an electrically driven tool that can be operated by the uninitiated and will possess both the required mechanical precision and the correspondingly necessary robustness.

In such tools an output shaft is driven, generally via a gear mechanism, by an electric motor that can in each case be activated by external switching means, the said output shaft, in its turn, then driving the tool associated with it, which may—for example—be a drill, a circular saw blade, a polishing disk, or the like. Traditional electric hand tools therefore consist in most cases of a two-shell housing, in which these parts are so fitted together that the housing itself, which generally consists of an appropriately hard plastic material (Duroplast), will not only serve as cladding or covering, but also acts as a structural or supporting element for the other components and will accommodate, in grooves or recesses for example, bearings for gear mechanisms or for the driving motor itself, so that the housing, at one and the same time, acts as a structural bearing element for the rotor and stator of the driving motor or the gear elements of the implement.

In a known hand tool machine of this type (DE-OS 34 13 233) a first bearing half shell for the rotor shaft end adjacent to the hand grip of the electric motor is connected to a housing half shell, and—with a view to the simultaneous grouping of the other bearing half shell with the first bearing half shell (pillow block)—a bearing bridge separate from the housing, which also acts as carrier of the electrotechnical components, is then so connected that the other housing half shell no longer has to perform any bearing or supporting function at all. In this way, even with the housing not yet closed, one obtains support for carbon brush holders, radio interference suppressors and any additionally provided luminescent indicators. The arrangement also makes it possible to check and test the implement while the housing is open.

It is also known (DE-OS 35 02 442) to arrange a motor bridge at one end of the stator of an electric motor, the design as a printed circuit of the said bridge being preferably such that it will support partial electric assemblies, including carbon parts, and that it will be connected to the stator both mechanically by means of fixing screws and electrically by means of appropriate contact tongues that ensure electric contact connection to the ends of the stator winding. This motor bridge also contains a seating opening for the associated roller bearing of the rotor shaft, so that mechanical prefixing to the stator also ensures appropriate alignment of the rotor with respect to the stator and the position of the air gap.

It is further known that the construction of such electric hand tools, hand drills being a case in point, can be simplified by basing the design, at least as far as the electric circuitry is concerned, on the use of electric plug-in components, so that the required electric wiring becomes reduced and a large number of current-conducting parts, including those for reversing the direction of rotation of the tool and switching it on and off, assumes the form of links that can be inserted in appropriate plastic components, including the housing itself, or in some cases be incorporated in these components already during their manufacture. One known electric hand tool (DE-OS 36 06 926) thus comprises a housing, the electric motor driving the implement and, as far as the electric circuitry is concerned, elements and leads in the form of block components that can be plugged into each other.

In connection with electric hand tools it is also known quite generally (DE-PS 33 11 557) that a bridge-like holding device—which can also be described as a motor bridge—can be arranged at one end of the stator of the electric motor for a hand tool. This motor bridge is intended to ensure the positioning and supporting of the rotor-shaft roller bearing that is held in this manner and can be appropriately connected to the stator—for example—by arranging pins on the end face of the motor bridge that point in the direction of the stator, the said pins making it possible to plug the motor bridge into the stator and thereby obtain correct alignment. In this way, relying on an appropriate seating aperture in the motor bridge to hold the associated roller bearing of the rotor shaft, one also obtains the final position that determines the air gap. But the real aim of this known method of supporting the rotor of an electric motor is really that of making it possible to balance the rotor together with the roller bearing fixed to the rotor shaft prior to assembly, i.e. to perform the balancing of the rotor with all the essential parts, including the rotor shaft roller bearing, and only afterwards insert the outer ring of the roller bearing into the appropriate recess in the motor bridge.

Notwithstanding such piecemeal simplifications in structure and form, known electric hand tools are still subject to the problem that the individual components constituting the implement are always interdependent to a greater or lesser extent, so that the accuracy of the two-shell housing will also—at least—codetermine the accuracy with which the electric driving motor is positioned and supported, a situation in which there may well arise advantages as regards the number of building components required for an individual assembly, while the final assembly and the checking of the proper functioning of the individual components and their interaction becomes all the more complicated. Consequently, and this represents an insight of the present invention, this development direction of manifold interdependencies between the individual building elements may reveal itself as a mistake that will make possible simplifications in the structure, form and design of electric hand tools up to a certain threshold value, but will thereafter have the opposite effect and bring in its wake greater costs as regards assembly, accuracy requirements to be met by individual components, testing for proper functioning, etc., and right through to the maintenance and—of course—also the repair of such tools.

It is, therefore, the object of the present invention to produce a fundamental change in the structural design of electric tools, especially electric hand tools, and at one and the same time to bring about a drastic simplification of this design and thus to ensure a substantially simpler final assembly of the implement, i.e. to introduce an improvement at a stage that hitherto invariably proved to be particularly costly and not capable of further automation, the said stage also comprising the final operational checkout.

ADVANTAGES OF THE INVENTION

The electric tool in accordance with the present invention solves this problem by means of the characterizing features of the independent claim and has the decisive advantage that the electric tool consists of an accurately defined number of individual components, each of which is a self-contained unit and fully capable of operating on its own, so that—and this represents yet another great advantage of the present invention—each can be subjected to a separate operational checkout, thereby making sure that final assembly—of which both the cost and the complication have been drastically reduced—will utilize only parts that have already been tested for perfect functioning under certain points of view and are therefore of guaranteed reliability.

In doing this, the present invention only seemingly accepts a presumed disadvantage consisting of the fact that the core piece of each and every electric hand tool, namely the electric driving motor, is a completely self-contained and appropriately encapsulated drive unit that comprises all the necessary bearings for the rotor shaft and the other individual motor components, all perfectly centered, for which purpose one may advantageously use a universal motor as described in the German utility model G 89 08 646.5 and in DE-OS 39 23 421. Having made specific reference to this available description, no detailed explanation of this universal motor will here be included. It is to be understood that any other electric driving motor constituting a self-contained drive unit is suitable for the realization of the present invention. However, the electric motor is to be so designed that, subject to the inclusion of the end shields on both sides, each to comprise the associated rotor shaft bearing and to be perfectly centered, the motor constitutes a self-contained unit that comprises also the brush-holders, the ventilator wheel and, where appropriate, also a rotatable switching ring for reversing the direction of rotation of the electric motor and/or switching it on and off. Accordingly, the housing does not have to perform any function of supporting individual parts of the driving motor and only has to be designed in such a way as to be capable of accommodating the driving motor as a whole and holding and supporting it by means of, for example, elastomeric bearing means present on at least one side.

Consequently, the invention also makes it possible for the housing itself to consist of several areas, though the subdivision should generally be effected in the axial direction of the electric hand tool, where the main part of the housing has a cylindrical, closed, tubular structure of the type already known per se in specially designed professional hand tools, so that one has to do no more than slide the drive unit into this housing until it comes to rest against the stop.

The design of the electric hand tool according to the invention also provides for the gear mechanism of the particular electric hand tool under consideration, say the angle head of a right-angle grinder or the gearing head of a hand drill, to be flange-mounted onto the output side of the self-contained, rigid and self-supporting unit of the electric driving motor, that is to say mounted at the point where the end of the motor shaft projects beyond the end shield at the A-end on the driving side, the said end of the motor shaft being either itself designed as a gear wheel or carrying an appropriate pinion; the electric driving motor is then slid into the tubular protection housing, and the connection to the housing is obtained via bores on the side of the gearing head, so that the assembly—as it were—proceeds from the back and the electric motor, by means of an appropriate projection on its end shield, merely fits into a housing recess on the side away from the gearing mechanism, thus obtaining secure and preferably damped and resilient support also on this side.

Subsequently, an electric circuitry module with a small housing part of its own can be slid into the as yet open rear of the housing, the said module, which comprises all the electrical wirings, being preferably connected to the motor unit by no more than two plug-in connections that are provided on appropriate projections on the side of the circuitry module adjacent to the motor. Assembly is then completed by adding the rear cover of the housing, so that the essential advantage of such a design becomes immediately obvious: it consists of the fact that such a design makes possible a highly rational and, above all, fully automated final assembly.

Moreover, the modular construction mode that the invention ensures to a hitherto unknown extent makes possible the pre-assembly of completely self-contained structural components and therefore the supply for final assembly of individual components that as such have been fully tested, as well as a particularly simple housing concept, so that considerable cost savings can be obtained not only in the final assembly stage, but also in the manufacture of the housing.

Further advantages achieved by means of the invention include the fact that an efficacious sound insulation can be obtained. In particular, the invention avoids vibration transfer by body conduction, precisely because the housing no longer forms part of the driving motor and its supports, but rather accommodates the driving motor on at least one side via rubber suspensions, so that a considerably reduced sound level is obtained. Electric contacts are obtained exclusively by means of plug-in tags, i.e. plug-in contacts, there being practically no need to provide wiring, because this wiring is either transferred into the electric circuitry module, in which an appropriately prepared printed circuit makes possible the realization of the desired electric switching possibilities, including control by means of phase control and the like, or is provided within the electric driving motor, which in a preferred embodiment disposes of a punched-grid wiring structure combined with a rotatable switching ring, so that—given appropriate preparation of openings in the punched grid and depending on the use to which the motor is to be put and the type and design of the electric hand tool, the necessary circuits can already be provided within the motor unit.

The modular construction mode in accordance with the invention also leads to a substantial simplification of subsequent servicing, since in the event of damage one has to do no more than simply substitute certain structural units or modules without incurring any substantial assembly costs.

Furthermore, even subsequent innovative developments do not call for major adaptations, because the individual modules, seen per se, can undergo appropriate development steps without this making it necessary to introduce far-reaching changes into the implement as a whole or to subject it to complete redesign.

Lastly, the manufacture of electric hand tools is also simplified in the production area, because the same drive unit, namely the self-contained electric driving motor, can be used for an arbitrary number of electric hand tools, so that—given the greater production quantities—one obtains reduced production costs, while the fact that only a single motor is required also permits smaller quantities to be kept in stock.

The necessary adaptations of the drive unit to each particular application can then be effected in the area of the flange-mounted gearing head and/or on the side of the electric connections, i.e. in the electric circuitry module, which is always appropriately matched to the different types of electric hand tool to be produced.

The features listed in the sub-claims make possible advantageous further developments and improvements of the invention. Particular advantages derive from the incorporation of an additional component, namely an external setting ring that can be slid over the closed and tubular housing body until it reaches a position in which inwardly pointing projections, passing through appropriate openings in the housing, enable it to make contact with the switching ring in the vicinity of the end shield at the B end of the driving motor, so that it becomes possible to displace the switching ring to obtain reversal of the direction of rotation and to switch the implement on and off.

A further advantage derives from the fact that the adaptation of the various tool-specific gearing heads to the single universal motor is altogether unproblematical, since appropriate adaptation inserts can be provided to meet specific needs.

BRIEF DESCRIPTION OF THE DRAWING

Various embodiments of the invention are shown in the drawing and will be discussed in greater detail in the description given hereinbelow. The figures included in the drawing are as follows:

FIGS. 1, 2 and 3 relate to a special embodiment of an electric hand tool, namely a right-angle grinder, and show successive assembly processes, the modular character of the present invention being particularly well illustrated by the sequence of FIGS. 1, 2 and 3, while FIGS. 4, 5 and 6 show a sequence of successive assembly processes comparable with those of FIGS. 1, 2 and 3 but relating to a hand drill, first in the exploded form of FIG. 4 (corresponding to FIG. 1), and then in the partly assembled position of FIG. 5 (corresponding to FIG. 2) and, lastly in the fully assembled position of FIG. 6 (corresponding to FIG. 3).

FIG. 7 shows once more, though to a larger scale, a side elevation of the tubular main housing, specifically for the right-angle grinder of FIGS. 1, 2 and 3, while

FIG. 9 shows a top view of the tubular main housing, and immediately to the right FIG. 10 shows a schematic top view of a special embodiment of the electric circuitry module to be slid onto and into the housing, while FIGS. 11, 12 and 13 show sectional views (albeit with omitted parts) and an enlarged detail that illustrate more clearly how the external setting ring makes possible appropriate switching of the electric driving motor.

DESCRIPTION OF THE EMBODIMENTS

The basic idea underlying the present invention is that of producing an electric hand tool by axially fitting into each other and fixing a series of structural units or modules, each of which can be completely pre-assembled and, as regards modules that perform either mechanical or electrical functions, also pretested. The individual structural units or modules constitute self-contained functional units and have an external structure specifically designed to present end faces or contact surfaces that are matched to each other—as far as dimensions are concerned, of course, there is also radial matching among the modules, so that simple axial assembly and—where necessary—also fixing will produce both the mechanical connection and, wherever this may still be required, also the necessary electric contacts, thus making it possible to perform the entire final assembly process in a fully automated manner, relying wholly on robots. There is also the further advantage that a detailed functional checkout in the fully assembled condition is no longer needed, because the individual components or modules have already been tested and are then brought together and joined to each other in a fully operative, pre-assembled condition.

Before discussing the invention in greater detail, attention should be drawn to the fact that a particularly preferred embodiment of an electromotive drive, namely a fully assembled, self-contained universal motor specially designed for the requirements of the present invention, has been extensively described in DE-GM G 89 08 646.5, the priority of which is claimed for the present patent, so that hereinafter this driving motor will be discussed only to the extent to which this is necessary to understand the invention, especially as regards the outer form of the unit. Be it noted, however, that the available description of this known driving motor is hereby expressly made part also of the disclosed subject matter of the description of the present invention and that reference is made to it.

However, other self-contained universal motors are also suitable for realizing the present invention, always provided that they possess the following properties that will now be discussed with the help of FIG. 8.

Figure 8:
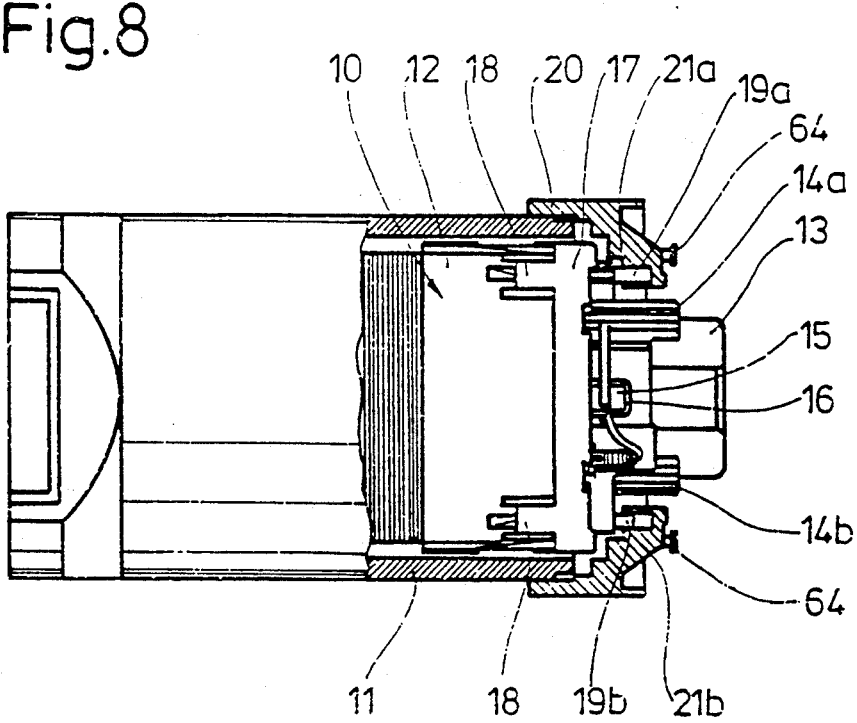
FIG. 8 shows in a part view how the electric driving motor is accommodated in the tubular main housing (shown only in part) and, in a sectional part view, the external setting ring and its interconnection with the switching ring of the electric motor.

The universal motor suitable as a source of driving power for the realization of the present invention is shown in FIG. 8 under reference 10; in the part view of FIG. 8 it is situated inside a tubular main housing 11 (which will be discussed further below) and is of a general cylindrical shape, complete with an end shield 12 at the B-end that is so designed as to constitute a hub 13 for the rotor shaft bearing on this side, which —as a single piece—is held by ribbed carriers 14a, 14b arranged on both sides. On the outwardly pointing outer annular surface (not visible in the figure) of the end shield there rests a rotatable switching ring that also carries the brushes 15 in tubular brushholders 16. A circlip 17, which is anchored to the end shield 12 by means of the inwardly projecting locking lugs 18, secures this switching ring in position and prevents it from falling off in an axial direction.

With a view to causing the switching ring to perform the rotary motion that—as described in the previously mentioned utility model and the corresponding DE-OS 39 23 421—makes it possible to switch the electric motor on and off and to reverse its direction of rotation, the switching ring is provided with the axial projections 19a, 19b, the said projections making operating contact with an external setting ring 20 by virtue of the fact that the latter, in its turn, is provided with the inwardly pointing projections 21a, 21b that engage with the projections 19a, 19b of the switching ring in such a manner as to cause it to follow the rotations of the external setting ring 20. Consequently, it is not only possible to orientate the brushes in a new angular position corresponding to the particular direction of rotation, but the necessary electric switching can also be performed. This arrangement is disclosed more fully in copending application Ser. No. 551,483, filed Jul. 11, 1990, and entitled Switching Device for the Electric Switching of Electric Tools.

Another essential feature is that in an in itself arbitrary position of the end shield 12 (in the embodiment here illustrated within the carriers 14a, 14b) there should be situated two external plug-in contacts (shown only in FIGS. 10 and 11 as 22a, 22b), which represent the only current supply points for the driving motor and must therefore be connected to an external current supply, which in the embodiment here illustrated is done by means of plug-in connections to the electric circuitry module, which will be described and discussed further below.

Figure 7:
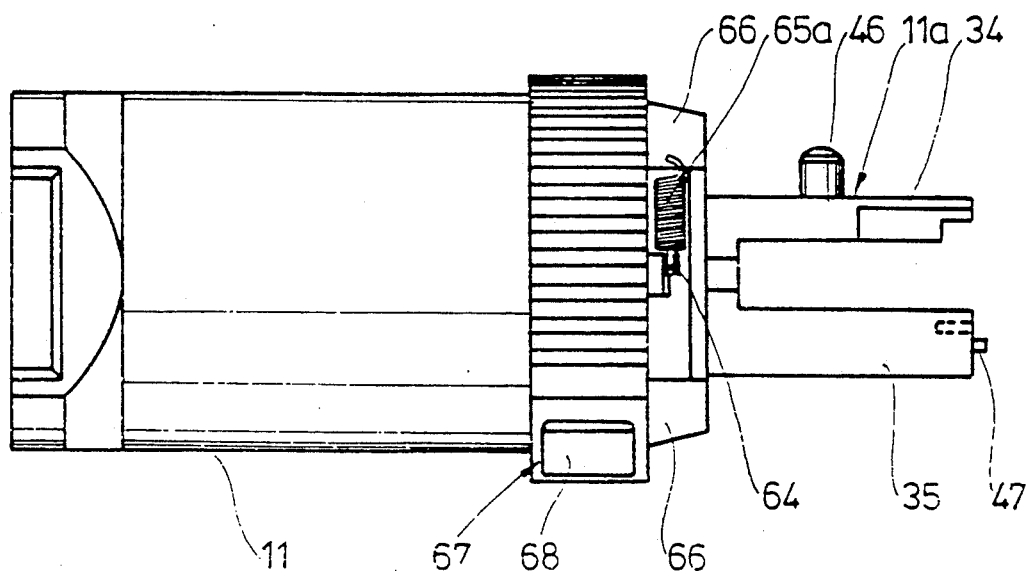

As regards FIG. 8, lastly, it should be noted that in this sectional representation—with a view to facilitating understanding—the tubular main housing to the left in the plane of the drawing has not been extended beyond the external setting ring, as can be seen more clearly from the view shown in FIG. 7, thus making it possible to provide a better view of the B-end motor details in FIG. 8. Referring to FIGS. 1-3 and 4-6, it is now proposed to consider the modular relationships of the basic structure of the electric hand tool in somewhat greater detail.

The electric driving motor 10 shown in FIG. 1 corresponds to the hitherto discussed embodiment illustrated by FIG. 8 and comprises a central stator package 25, which is embraced at its two ends by the pot-shaped end shields 12 (end shield at the B-end) and 12' (end shield at the A-end). By means of appropriate measures, which are discussed in detail in the aforementioned DE-OS 39 23 421 these end shields are firmly seated on and connected to the stator, forming on their end faces the hubs 13 and 13' for the rotor shaft, while (ventilation) openings 26 in the end shields permit one to note part of the ventilation wheel 27 and the stator winding 28. Since the representation of the motor in FIGS. 1 and 4 is turned through 90° as compared with the representation in FIG. 8, this position also permits one to note the electric plug-in contact in the vicinity of the hub carrier 14a on this side.

As can be seen, the driving motor 10 is a self-contained electric motor that supports the rotor shaft by its own means in a centered position, with the additional feature that the end shield 12' at the A-end, over and above the stable pot made of plastic material, can be further reinforced by a metallic disc lining (on the inside), which forms a central opening for the rotor shaft 30, at the end of which there is carried the driving pinion 29. It is therefore possible to attach to this outer annular surface of the end shield at the A-end an appropriately designed annular surface of a gearing head 31 corresponding to the particular type of electric hand tool under consideration, the attachment being effected by means of a flange mounting with an appropriate number of screw connections 32, so that in a first assembly step the self-contained driving motor and the self-contained gearing head 31 come to constitute a compound structural unit 33 that does not require any further external bearings, because it constitutes a stable, self-contained and compact functional unit.

The modular starting situation for the final assembly is completed by the further components shown in FIG. 1, namely the main housing 11, which has already been referred to above and is of a cylindrical tubular shape (i.e. not a half-shell structure), with a forked seating projection 11a at its rearward end, this generally U-shaped projection having an upper leg 34 and a lower leg 35. The distance between these two legs is so chosen as to permit an electric circuitry module 37 to be slid into the seating projection 11a, the said circuitry module—in the case of the embodiment shown in FIGS. 1, 2 and 3, which relate to a right-angle grinder—having the form shown in top view in FIG. 10. The circuitry module can therefore be designed in such a manner that it will itself constitute a part of the housing that is open on one side and has a raised edge 38, this housing part containing the printed circuit board 39 that supports a number of electric components 40, including a phase control circuit as well as a lustre terminal 41 and a small knurled setting wheel 42 that can be operated from outside the housing, and controls the phase control circuit to vary the speed of the unit. Furthermore, and this is an essential feature, the circuitry module is provided with two projections 43a, 43b that terminate in contact plugs. If the electric circuitry module 37 is now inserted in the seating space 36 of the main housing 11, and in this connection we need not for the moment consider the previously mentioned setting ring 20, the projections 43a, 43b with their contact plug terminals will in any case penetrate sufficiently far into the inner tubular main housing 11 as to make it possible to obtain—in the course of the subsequent assembly—an electric plug-in connection with the motor contacts 22a, 22b, which are not carried on the switching ring and are not therefore rotatable. Once this has been done, one has to all intents and purposes completed the wiring of the electric hand tool, bar the circumstance that the two leads 44a, 44b of the electricity supply 44 have yet to be connected to the electric circuitry module 37 by means of the lustre terminals 41. This can best be done by first sliding the leads 44a, 44b through the rear cover 45 of the housing and then passing them under the strain relief clamp 46 on the upper leg of the forked projection of the main housing 11; after the circuitry module has been inserted into its seating, the ends of the leads are then bent back and connected to the lustre terminals 41. This second compound structural unit 48 (FIG. 2) can then be completed by sliding a pot-shaped rear cover 45 onto the main housing 11, this cover being appropriately aligned by means of a locating pin 47 projecting from the lower leg 35 and then, as last step, secured in position by means of, say, a single screw connection.

All that has to be done thereafter is to properly align the two compound structural units 33 and 48 of FIG. 2 and then to slide them axially into each other, thereby obtaining—automatically as it were—the complete and fully assembled electric hand tool shown in FIG. 3, in this particular case in the form of a right-angle grinder 50, the fact that the driving motor with the attached gearing head has been slid into the completed housing component also making certain that the necessary electric connections are obtained. One can readily see that the housing here performs nothing other than a covering function and plays no part whatsoever in supporting moving components.

The motor with the attached gearing can be fixed to the assembled housing by providing the gearing head with an appropriately dimensioned radial ring flange, so that the forward part of the housing will come to rest against this flange and can be fixed to the gearing head by means of appropriate further screws 49. When the two parts have been slid into their final positions, the hub 13 on the motor will come to rest in a corresponding recess 50 on the inside of the housing, which is shown by means of a dotted line in FIG. 1, where it will be of advantage if the said recess is either made of an elastomer or provided with a pot-shaped elastomer lining, so that the motor will be held and supported at this point in a vibration-free and damped manner, this in addition to the bolting to the gearing head at the forward edge of the housing.

Attention must yet be drawn to yet another special feature, namely that the electrical and mechanical switching possibilities are designed according to the particular nature of the electric hand tool produced in this manner from modular components; change-overs in the gearing mechanism, say from one gear to another or from drilling to impact drilling and vice versa, are produced within the gearing head 31, for example, by operating a setting wheel or a setting lever indicated by reference 51; reversals of the direction of rotation, if these are desired, can be and—in general principle—are always obtained in a functional and advantageous manner by rotating the setting ring in the vicinity of the end shield 12 at the B-end, because this also permits one to change the angular position of the carbon brushes with respect to the commutator and thus to optimize the motor efficiency.

On the other hand, it is also possible for implements where direction reversal is not desired, as is the case of the right-angle grinder illustrated in FIGS. 1–3, to exploit the possibilities offered by the external setting ring 20 and the displacement of the switching ring for the purpose of switching the tool on and off, so that the circuitry model will not have to perform this function and—in the embodiment here considered—will therefore be used solely for setting the speed of revolution of the driving motor, which the user can control via the knurled setting wheel 42, this wheel being accessible through the opening 52 in the rear cover 45 of the housing.

If activation of the switching ring is therefore desired for reversing the direction of rotation or for switching on and off—this will of course depend on the nature of the associated punched grid, which determines the electrical wiring—the previously mentioned setting ring 20 must also be slid onto the main housing. The possibility of switching the implement on and off that this offers in the case of a right-angle grinder will be discussed further below by reference to FIGS. 10, 11 and 12.

FIGS. 4, 5 and 6, which retain the basic concept of the invention, namely five main modules or structural units and their axial combination, at first into superordinate but still partial units and then, in a subsequent step, into the final implement, show how this basic concept is applied in the case of an electric hand drill, where the individual modules or structural units are in part of very different shape and yet perform the same function that has already been explained in detail above.

The electric driving motor 10 provided in this case can be the same as the one previously used; the other structural units or modules are identified by the same reference but, given their different shape, are also distinguished by the addition of an apostrophe.

If, for example, the gearing head 31' is of larger dimensions, as it will be when it has to accommodate an additional gear-changing mechanism and/or the possibility of changing to impact drilling, additional use is made of an adapter plate 55, which is first firmly attached to the end shield at the A-end of the driving motor 10 by means of the screws 56 and then serves for fixing the motor to the gearing head 31' by means of further screws 57. These screws can then be used also for joining the resulting subassembly or compound structural unit, which in FIG. 5 is indicated by reference 58, to the fully assembled main housing 11', which in this embodiment consists of a tubular main housing part 59 and meaningfully also of a pistol-grip part 60 that is already molded onto it.

Consequently, the electric circuitry module 37' of this embodiment is likewise of different shape, namely generally elongated to match the form of the pistol grip, and is also completely assembled and wired from the electrical point of view, to the point where the "gas lever" 61, which projects forward from the pistol grip when the module is inserted in the main housing 11', can be operated.

In this embodiment, once again, the electric circuitry module 37' is provided with contact-plug-carrier projections 62 that point axially forward in the direction of the driving motor, so that upon correct insertion of the electric circitry module 37' into the main housing 11', which can be obtained in a quite unproblematical manner by the use of suitable guides and fits, and subsequent closure of the rearward opening by means of a housing cover 60' that completes the pistol grip, one obtains the completed second subassembly, i.e. the housing, as the compound structural unit 48'. The final assembly can then be realized by simply joining the two subassemblies 33' and 48' in the axial direction to make up the complete implement 50' shown in FIG. 6.

In this embodiment, the mechanical switching functions concerning the gearing (gear changes and switching from drilling to impact drilling and vice versa) are performed by means of a setting lever 63 provided on the gearing head, while the electric circuitry module 37' is responsible for both the switch on/switch off function and for setting the speed of revolution, both functions being actuated via the "gas lever" 61.

If the hand drill shown in FIGS. 4–6 is to be capable of direction reversal, as may be desired in some models and for greater comfort, the tubular part of the main housing 11' must also be provided with the setting ring 20 that has already been discussed above and will be further discussed hereinafter. Given corresponding design of the punched grid in the interior of the motor, this ring will then effect the direction reversal, as well as the rotation of the brushes, by changing the angular position of the switching ring. In this case, once again, the projections 21a, 21b of the external setting ring 20 pass through openings in the housing, which extend over a specified angle along the circumference and are otherwise covered by the setting ring itself, to engage with the actuator pins on the switching ring.

When the external setting ring is used for switching the implement on and off, as is the case of the previously considered right-angle grinder, the switching ring will be provided with an additional device for automatic return that is activated only by a release mechanism, as shown in FIGS. 11, 12 and 13. In this case return springs 65a, 65b will be attached to additional fixing pins 64 on the inwardly pointing projections 21a, 21b of the setting ring 20 (see FIGS. 7, 8 and 11), the other end of these springs being attached to the frames 66 that form part of the housing and, tapering conically towards the rear, also carry the internal U-shaped seating projection 11a of the main housing 11.

The setting ring 20 also supports a stop device 67, which in the case of the embodiment here illustrated consists of a rocker switch 68 that is hinged more or less at the center and on one side terminates in a stop dog 69 bent through a right angle, while its other end is provided with a small pressure spring 70 and is therefore biased in such a manner that the stop dog 69 will be pressed inwards. It can readily be seen from FIGS. 11, 12 and 13 that when the outer setting ring is displaced in a counterclockwise direction as indicated by the arrow A and the switching ring in the interior of the motor is made to perform a corresponding slave motion by means of the projections 21a, 21b, the stop dog 69, upon attainment of a predetermined position, will be pressed into a recess 71 fixed with respect to the housing, so that the external setting ring 20 will remain in this position even when the user lets go of it. In the case of the illustrated grinder embodiment, this arrangement can be used to switch on the implement and then to maintain it in the switched-on position as previously described, in which position the spring-controlled end of the rocker will be forced outwards as indicated by the arrow B in FIG. 12. If this end of the rocker is then pressed to switch the implement off, the stop dog 69 will be released from the retaining recess 71, so that the external setting ring 20 will jerk back into its original (rest) position and, given an appropriately great design force exerted by the return springs 65a, 65b, will cause the switching ring in the vicinity of the end shield at the B-end of the driving motor to move with it, thereby switching off the implement.

Since in the switched-off position the rear edge of the rocker switch 68 projects beyond the outer surface of the setting ring and the housing, it will be sufficient—always provided that the rocker is suitably located—for the user to put down the implement: the self-weight of the grinder will then ensure that the rocker is pressed back, thereby triggering the return motion of the setting ring 20.

In FIG. 11 one can also recognize the switching ring, which carries the carbon brushes and is indicated by reference 72. FIG. 10 represents a top view of FIG. 8 as seen from the right in the plane of the drawing, while FIG. 11 corresponds to FIG. 7, again seen from the right, i.e. with a setting ring mounted on the main housing 11, but with the driving motor removed. In FIG. 11, lastly, one can also note the tensioning springs 73a, 73b for the carbon brushes, as well as the seating recesses 74a, 74b, which serve to accommodate the radio interference suppressors 75 of the driving motor. Also shown is guide groove 78 which receives the edge of the housing when the ring is mounted on the housing.

In the embodiment of FIGS. 4, 5 and 6, moreover, the rear part of the pistol grip, i.e. the rear cover 60' of the housing, can also be fixed by providing the said cover 60' with an upwardly pointing, single-piece hook 76 that will engage with a corresponding recess on the inside of the main housing 11' and then securing the entire arrangement by means of an additional screw 77 at the bottom.

All the features referred to in the description, the claims and the drawing, can be essential to the invention, either individually or in any combination whatsoever.

We claim:
1. An electric tool, comprising the following modular components:
   a self-contained electric driving motor including a stator, rotor shaft, and end shields connected to respective ends of said stator and rotatably supporting ends of said rotor shaft therein for rotation about a longitudinal axis;
   a self-contained gearing head fixedly attached to one of said end shields of the electric driving motor, said gearing head having a tool holding fixture and means for connecting said tool holding fixture to one end of said rotor shaft;
   fastening means for attaching said self-contained motor to said self-contained gearing head, said gearing head and said attached electric motor comprising a first modular subassembly;
   an at least partly tubular main housing having an open end and an opposite end for axially receiving said driving motor in said open end, said housing extending to said gearing head and enclosing said driving motor of said first modular subassembly, said housing having a circuitry module seat at said opposite end;
   an electric circuity module received in said seat on the opposite end of the main housing opposite to the gearing head;
   connecting means between said motor and said electric circuitry module for establishing an electrical plug-in connection therebetween; and
   a rear cover for enclosing said circuitry module in said seat and said opposite end of said housing;
   and means for positioning said cover in fixed relationship to said housing and driving motor.

2. An electric tool according to claim 1, wherein said housing and said electric circuitry module connected thereto comprise a second modular subassembly, said main housing opening slidably receiving at least said driving motor of said first subassembly therein to join said first and second subassemblies together, and means for connecting said main housing to said gearing head.

3. An electric tool according to claim 2, wherein said connecting means comprises a pair of terminals connected to and mounted on said motor, and respective plugging contacts on said electric circuitry module engaging said pair of terminals when said first and second subassemblies are connected together, and lead means for connecting said electric circuitry module to an external source.

4. An electric tool according to claim 1, wherein said gearing head includes a ring flange, and at least a screw passing through said flange and engaging said main housing to connect said gearing head and housing together.

5. An electric tool according to claim 1, wherein said main housing includes a recess receiving one of said motor end shields opposite from said gear head therein to support said motor.

6. An electric tool according to claim 1, wherein said motor has an on and off state, and said switching ring is mounted for rotatable operation to switch said motor between said on and off states.

7. An electric tool according to claim 6, further comprising biasing means for biasing said switching ring to the off state in the absence of a rotative force applied thereto.

8. An electric tool according to claim 1, wherein said motor includes brushes, and said switching ring is mounted on said motor for rotatable operation and carries said brushes thereon, whereby rotation of said switching ring changes the direction of rotation of said motor.

9. An electric tool according to claim 1, and a setting ring on the main housing, ring connecting means connecting said setting ring to said switching ring of the driving motor in such a manner to prevent relative rotation therebetween.

10. An electric tool according to claim 9, wherein said setting ring is provided with inwardly pointing projections that pass through openings in the housing, and said switching ring has axially oriented actuator pins thereon, whereby said actuator pins slidably engage said projections when said setting ring is moved toward said switching ring.

11. An electric tool according to claim 9, wherein the setting ring is carried on the outside of the housing by means of a guide groove in the housing engaging an edge of said setting ring.

12. An electric tool according to claim 11, wherein said external setting ring is provided with a central opening receiving said housing therein in sliding engagement, a shoulder on said housing engaging said setting ring on one side, and said rear cover engaging said setting ring on another side to retain said setting ring on said housing.

13. An electric tool comprising the following modular components:
 a self-contained electric driving motor including a stator, rotor shaft, and end shields connected to respective ends of said stator and rotatably supporting ends of said rotor shaft therein for rotation about a longitudinal axis;
 a self-contained gearing head fixedly attached to one of said end shields of the electric driving motor, said gearing head having a tool holding fixture and means for connecting said tool holding fixture to one end of said rotor shaft;
 fastening means for attaching said self-contained motor to said self-contained gearing head, said gearing head and said attached electric motor comprising a first modular subassembly;
 an at least partly tubular main housing having an open end and an opposite end for axially receiving said driving motor in said open end, said housing extending to said gearing head and enclosing said driving motor of said first modular subassembly, said housing having a circuitry module seat at said opposite end and a recess receiving one of said motor end shields opposite from said gear head therein to support said motor said recess being defined by an elastomeric material;
 an electric circuitry module received in said seat on the opposite end of the main housing opposite to the gearing head;
 connecting means between said motor and said electric circuitry module for establishing an electrical plug-in connection therebetween; and
 a rear cover for enclosing said circuitry module in said seat and said opposite end of said housing.

14. An electric tool comprising the following modular components:
 a self-contained electric driving motor including a stator, rotor shaft, and end shields connected to respective ends of said stator and rotatably supporting ends of said rotor shaft therein for rotation about a longitudinal axis;
 a self-contained gearing head fixedly attached to one of said end shields of the electric driving motor, said gearing head having a tool holding fixture and means for connecting said tool holding fixture to one end of said rotor shaft;
 fastening means for attaching said self-contained motor to said self-contained gearing head, said gearing head and said attached electric motor comprising a first modular subassembly;
 an at least partly tubular main housing having an open end and an opposite end for axially receiving said driving motor in said open end, said housing extending to said gearing head and enclosing said driving motor of said first modular subassembly, said housing having a circuitry module seat at said opposite end;
 an electric circuitry module received in said seat on the opposite end of the main housing opposite to the gearing head;
 connecting means between said motor and said electric circuitry module for establishing an electrical plug-in connection therebetween; and
 a rear cover for enclosing said circuitry module in said seat and said opposite end of said housing,
 wherein the electric circuitry module is provided with a movable control, said cover having an opening through which said movable control projects, said movable control being connected to said circuitry module to effect speed variations in said electric tool.

15. An electric tool comprising the following modular components:
 a self-contained electric driving motor including a stator, rotor shaft, and end shields connected to respective ends of said stator and rotatably supporting ends of said rotor shaft therein for rotation about a longitudinal axis;
 a self-contained gearing head fixedly attached to one of said end shields of the electric driving motor, said gearing head having a tool holding fixture and means for connecting said tool holding fixture to one end of said rotor shaft;
 fastening means for attaching said self-contained motor to said self-contained gearing head, said gearing head and said attached electric motor comprising a first modular subassembly;
 an at least partly tubular main housing having an open end and an opposite end for axially receiving said driving motor in said open end and, said housing extending to said gearing head and enclosing said driving motor of said first modular subassembly, said housing having a circuitry module seat at said opposite end;
 an electric circuitry module received in said seat on the opposite end of the main housing opposite to the gearing head;
 connecting means between said motor and said electric circuitry module for establishing an electrical plug-in connection therebetween; and
 a rear cover for enclosing said circuitry module in said seat and said opposite end of said housing,
 said circuitry module seat comprising a forked internal extension of the main housing having opposing legs defining a recess which receives said electric circuitry module therebetween, at least one of said legs terminating adjacent said rear cover, and at least a screw extending through said cover into said one leg to connect said cover to said housing.

* * * * *